United States Patent [19]

Asano

[11] Patent Number: 4,660,535
[45] Date of Patent: Apr. 28, 1987

[54] SYSTEM AND METHOD FOR CONTROLLING IGNITION TIMING OF AN INTERNAL COMBUSTION ENGINE

[75] Inventor: Masaharu Asano, Fujisawa, Japan

[73] Assignee: Nissan Motor Company, Limited, Kanagawa, Japan

[21] Appl. No.: 749,441

[22] Filed: Jun. 27, 1985

[30] Foreign Application Priority Data

Jun. 30, 1984 [JP] Japan .................. 59-136702

[51] Int. Cl.$^4$ ............................................. F02P 5/14
[52] U.S. Cl. .................................... 123/425; 123/435
[58] Field of Search .............................. 123/425, 435

[56] References Cited

U.S. PATENT DOCUMENTS

| | | | |
|---|---|---|---|
| 4,063,538 | 12/1977 | Powell et al. | 123/425 |
| 4,106,447 | 8/1978 | West | 123/117 |
| 4,355,359 | 10/1982 | Kanegae et al. | 364/431.04 |
| 4,368,635 | 1/1983 | Yoshida | 73/35 |
| 4,370,964 | 2/1983 | Muranaka et al. | 123/425 |
| 4,373,489 | 2/1983 | Yamaguchi | 123/422 |
| 4,376,428 | 3/1983 | Hata et al. | 123/417 |
| 4,380,981 | 4/1983 | Enoshima et al. | 123/415 |
| 4,382,429 | 5/1983 | Enoshima et al. | 123/425 |
| 4,393,837 | 7/1983 | Sugihara et al. | 123/425 |
| 4,409,937 | 10/1983 | Asano | 123/425 |
| 4,417,556 | 11/1983 | Latsch | 123/425 |
| 4,420,967 | 12/1983 | Enoshima et al. | 73/35 |
| 4,423,621 | 1/1984 | Kenichi | 73/35 |
| 4,425,890 | 1/1984 | Yamaguchi | 123/418 |
| 4,450,811 | 5/1984 | Ichikawa | 123/425 |
| 4,452,204 | 6/1984 | Matsubara | 123/417 |
| 4,455,862 | 6/1984 | Takeuchi | 73/35 |
| 4,561,401 | 12/1985 | Hata et al. | 123/425 X |

FOREIGN PATENT DOCUMENTS

| | | | |
|---|---|---|---|
| 53-56429 | 5/1978 | Japan . | |
| 54-142425 | 11/1979 | Japan . | |
| 56-554 | 1/1981 | Japan . | |
| 57-212349 | 12/1982 | Japan . | |
| 58-13749 | 3/1983 | Japan . | |
| 58-82074 | 5/1983 | Japan . | |
| 0135362 | 8/1983 | Japan | 123/425 |
| 59-39974 | 3/1984 | Japan . | |
| 59-39972 | 3/1984 | Japan . | |
| 0113245 | 6/1984 | Japan | 123/435 |

*Primary Examiner*—Willis R. Wolfe, Jr.
*Attorney, Agent, or Firm*—Schwartz, Jeffery, Schwaab, Mack, Blumenthal & Evans

[57] ABSTRACT

A system and method for controlling an ignition timing of an internal combustion engine. In the system, an accumulated value of a deviation or a value corelative to the accumulated value is calculated as an error amount whenever the deviation between a crank angle value at a time when pressure in a combustion chamber has reached its maximum and a target value thereof, whether the error amount exceeds a predetermined allowable limit value is determined whether the error amount is calculated, a corrective amount of ignition timing is calculated when the error amount exceeds the predetermined allowable limit value. Consequently, the correction of ignition timing can be carried out in a quick response during the ransient driving state of engine and engine drivability can be improved.

16 Claims, 15 Drawing Figures

(A) $S_1 \sim S_6$ (B) $S'_1 \sim S'_6$ (C) $S_{11} \sim S_{61}$ (A) $S_6$ (B) $S_{60}$ (C) $S_{10}$ (D)

40  55
(TDC OF 6TH CYLINDER) (ATDC 30°)

SYSTEM AND METHOD FOR CONTROLLING IGNITION TIMING OF AN INTERNAL COMBUSTION ENGINE

BACKGROUND OF THE INVENTION

The present invention relates generally to a system and method for controlling an ignition timing of an internal combustion engine, and in particular relates to the system and method therefor, wherein the ignition timing is controlled so that a correction of the ignition timing angle value is quickly made during an engine transient operating condition.

A conventional engine ignition timing system described above is exemplified by Japanese Patent Application Unexamined Open No. Sho. 59-39,974 published on Mar. 5, 1984. In the disclosed system, pressure in a combustion chamber of the engine (cylinder pressure) is detected, a mean value $\overline{\theta pmax}$ is calculated from each value of detected crankshaft rotational angles $\theta pmax$ at which pressure in a particular engine cylinder or an arbitrary number of the engine cylinders has reached its maximum per compression stroke N times (for example, about 20 times), and the ignition timing is then corrected according to a comparison result between the mean value $\overline{\theta pmax}$ and a target value at which an engine output torque is a maximum (generally from 10 degrees after the top dead center (10° ATDC) to 15 degrees after the top dead center (15° ATCD)). This control mode is called MBT control (Minimum spark advance for Best Torque control).

However, since, in the above-identified system, the mean value $\overline{\theta pmax}$ is not calculated until the detected cranksaft rotational angle values $\theta pmax$ are measured, e.g., 20 times for each combustion stroke, the ignition timing is corrected actually once for each time that 20 values of the maximum crank angle values $\theta pmax$ are accumulated. Consequently, the correction of the ignition timing for MBT is delayed so that driveability of the engine is reduced when, e.g., the engine is operated under a transient (acceleration/deceleration) state.

SUMMARY OF THE INVENTION

With the above-described problem in mind, it is an object of the present invention to provide a system and method for controlling the ignition timing for the internal combustion engine, which improves a responsiveness of a correction control of the ignition timing without reduction of driveability and without sacrifice of a control stability.

This can be achieved by providing the system comprising: (a) first means for detecting an engine crankshaft rotatioal angle at which pressure in a combustion chamber has reached its maximum; (b) second means for calculating a deviation between the detected value of the crankshaft rotational angle and a predetermined target value thereof; (c) third means for calculating an error amount based on an accumulated value of the deviation whenever the second means calculates the deviation; (d) fourth means for determining whether the error amount exceeds a predetermined allowable limit whenever the third means accumulates the deviation; and (e) fifth means for correcting the ignition timing by an angle value so that the engine crankshaft rotational angle value at which pressure in the combustion chamber has reached its maximum accords with the predetermined target value whenever the fourth means determines that the error amount exceeds the predetermined allowable limit.

BRIEF DESCRIPTION OF THE DRAWINGS

A more complete understanding of the present invention may be obtained from the foregoing description taken in conjunction with the drawings in which like reference numerals designate corresponding elements and in which.

DETAILED DESCRIPTION OF THE PREFERRED EMBODIMENTS

Reference will hereinafter be made to the drawings in order to facilitate understanding of the present invention.

Figure 1A:
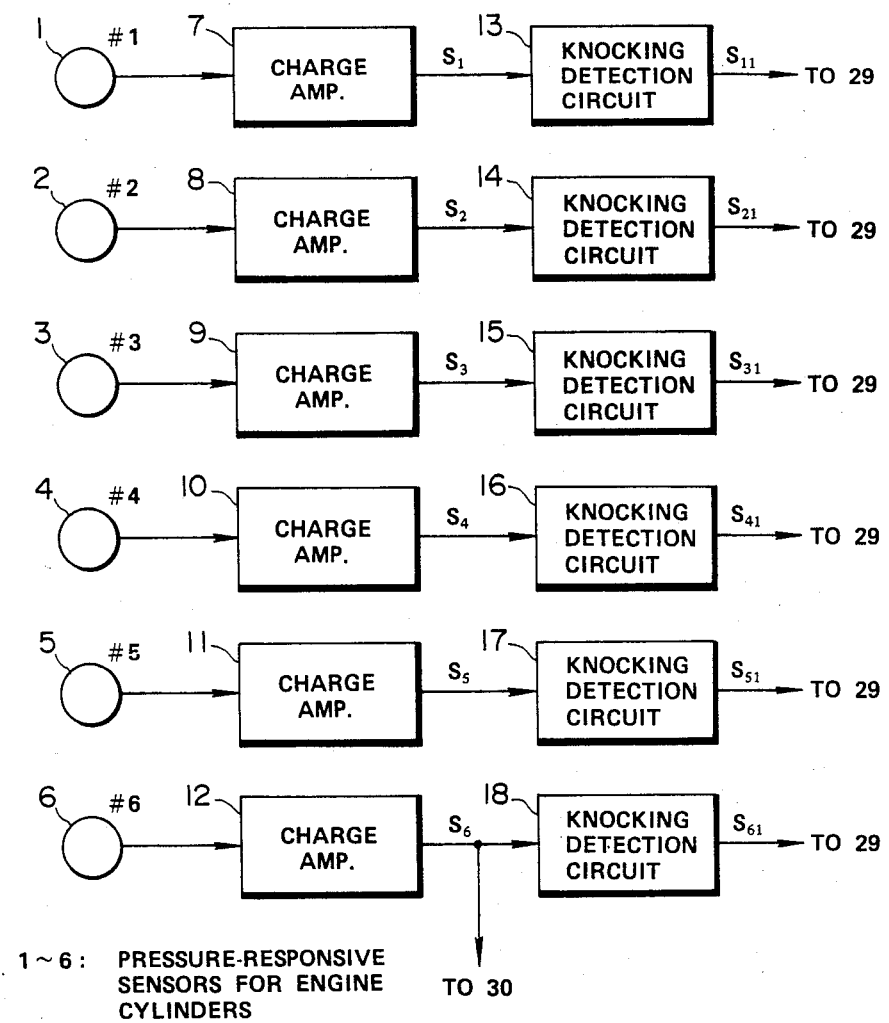
FIGS. 1(A), 1(B), and 1(C) are integrally simplified system configuration of a system for controlling an ignition timing for an internal combustion engine according to the present invention.
Figure 1B:
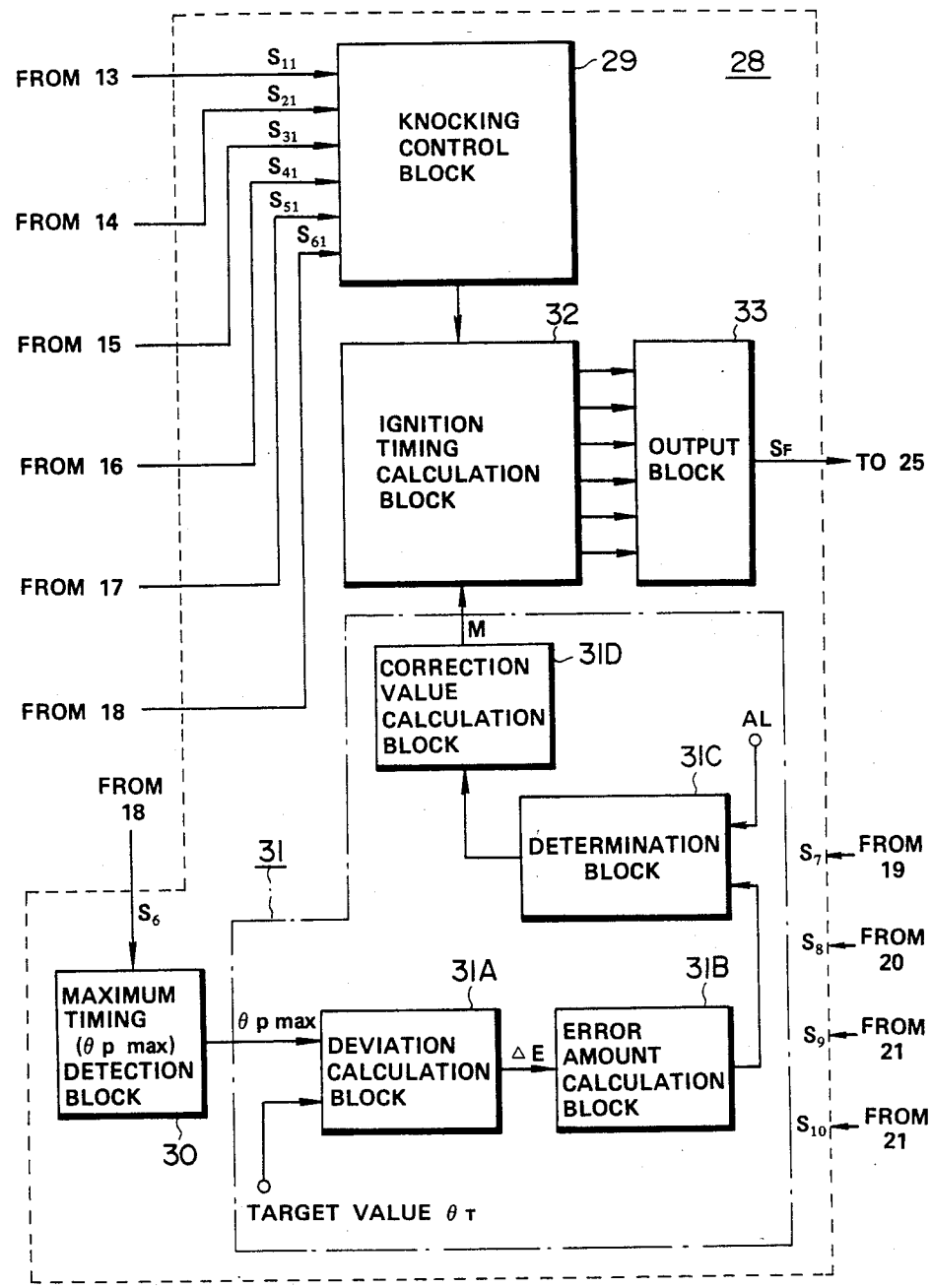
Figure 1C:
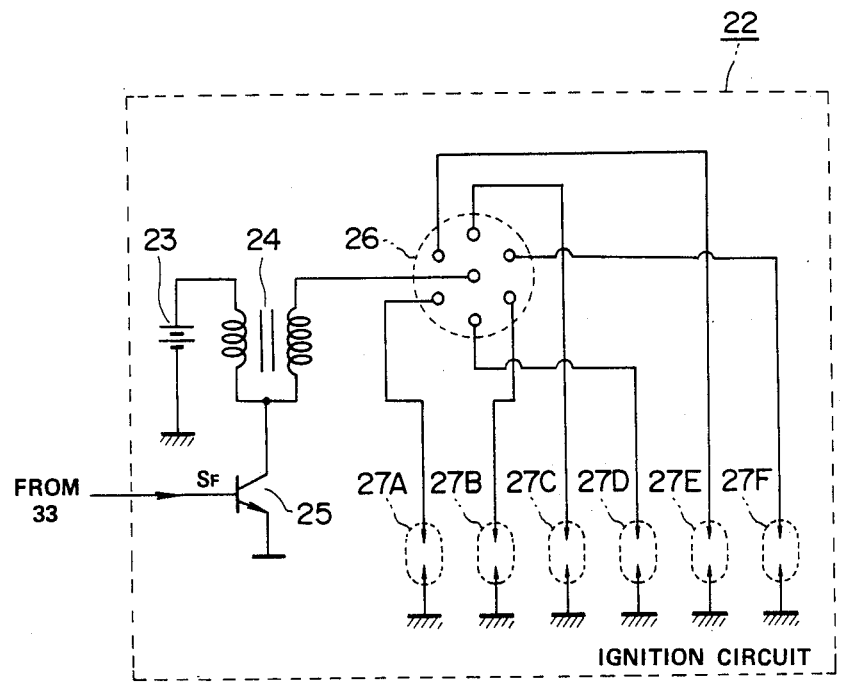
Figure 1C:
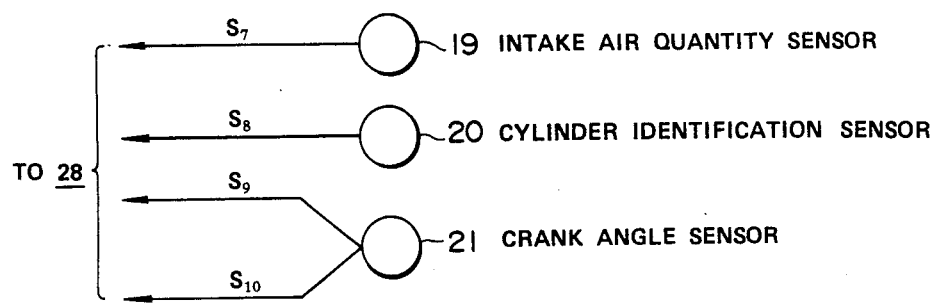

FIGS. 1(A), 1(B), and 1(C) show integrally a circuit block diagram of a first preferred embodiment.

It should be noted each block depicted at 28 encircled by a broken line is not specific but functionally indicated.

In FIG. 1(A), numerals 1 through 6 dénote pressure-responsive sensors, for example, mounted for respective engine cylinders of a six-cylinder engine in this embodiment. Each pressure-responsive sensor 1 through 6 comprises a piezoelectric element PZ in a washer form fixed on a spark plug IP attached to a cylinder head SH, as appreciated from FIG. 2. For the detailed structure of such piezoelectric-type pressure sensors 1 through 6, Japanese Patent Application Examined Open No. Sho. 58-13,749 published on Mar. 15, 1983 is exemplified and the contents thereof is hereby referenced.

It should be noted that numerals 1 through 6 of the pressure-responsive sensors correspond to the respective numbers of the engine cylinders (# n).

Figure 3:
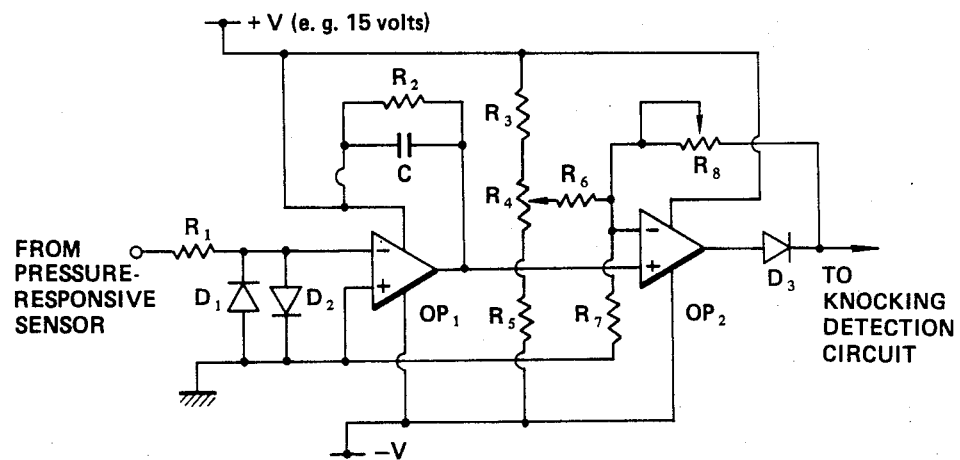
FIG. 3 is a specific example of an internal circuit of each electric charge amplifier shown in FIG. 1(A)

Numerals 7 through 12 denote electric charge amplifiers, each internal circuit of which is shown in FIG. 3. As shown in FIG. 3, the charge amplifiers 7 through 12 are conventional electric charge-to-voltage converters comprising two operational amplfiers $OP_1$ and $OP_2$, resistors $R_1$ through $R_8$, a capacitor C, and diodes $D_1$ through $D_3$. Each charge amplifier 7 through 12 outputs a voltage signal (pressure signal) $S_1$ through $S_6$ corresponding to pressure variation in each combustion chamber.

Figure 4:
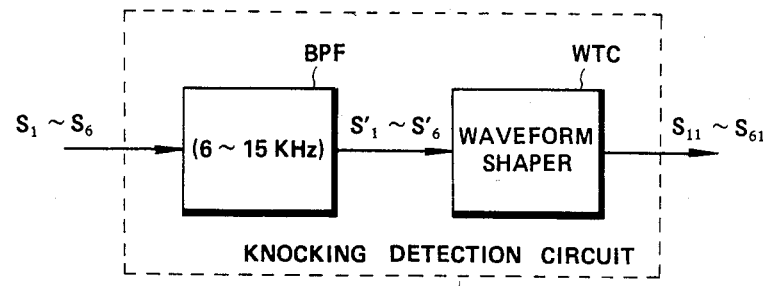
FIG. 4 is a circuit block diagram within each knocking detection circuit shown in FIG. 1(A)

Numerals 13 through 18 denote knocking detection circuits, each comprising, for example, a band-pass filter (BPF) and waveform shaper (WTC) connected in series with the BPF, as shown in FIG. 4, Each band-pass filter enables the passage of signal components $S_1'$ through $S_6'$ each having a frequency falling within a frequency band from 6 kilohertz to 15 kilohertz in which vibration frequencies in pressure due to knocking are involved. Each signal component $S_1'$ through which $S_6'$ is then sent to the waveform shaper (WTC), wherein the corresponding signal component is half-wave rectified and half-wave rectified signal component is then modulated (peak detection) to form an envelope signal $S_{11}$ through $S_{61}$ as shown in (C) of FIG. 5.

Figure 5:
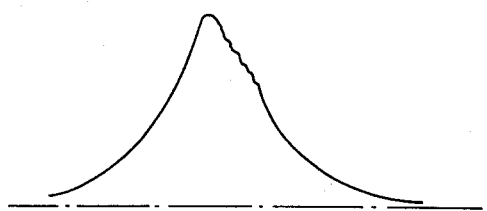
FIGS. 5A, 5B, and 5C are a waveform chart associated with a combustion pressure for explaining an operation of each knocking detection circuit shown in FIG. 4.
Figure 5:
Figure 5:
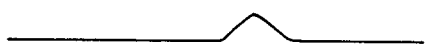

Each voltage signal $S_1$ through $S_6$ is shown in (A) of FIG. 5, each signal component $S_1'$ through $S_6'$ passed through the corresponding band-pass filter (BPF) is shown in (B) of FIG. 5, and each envelope signal $S_{11}$ through $S_{61}$ passed through corresponding waveform shaper (WTC) is shown in (C) of FIG. 5.

It should be noted that, as an alternative, in such knocking detection circuits 13 through 18, the voltage signals $S_1$ through $S_6$ are smoothed to form a signal having a background noise level corresponding to a normal noise in the engine and a difference between the formed background noise level and a maximum level of the above-described envelope signal may be outputted as each of the knocking signals $S_{11}$ through $S_{61}$.

Furthermore, numeral 19 denotes an intake air quantity sensor which outputs an intake air flow rate signal $S_7$ in accordance with the present intake air flow quantity of the engine.

Numeral 20 denotes an engine cylinder identification sensor which outputs, e.g., a cylinder identificaion signal $S_8$ whenever a cylinder piston of the cylinder number 6 (#6) has reached 80 degrees before the top dead center (80° BTDC) in its compression stroke. Therefore, a period of the engine cylinder identification signal $S_8$ corresponds to two revolutions (720°) of an engine crankshaft.

Figure 2:
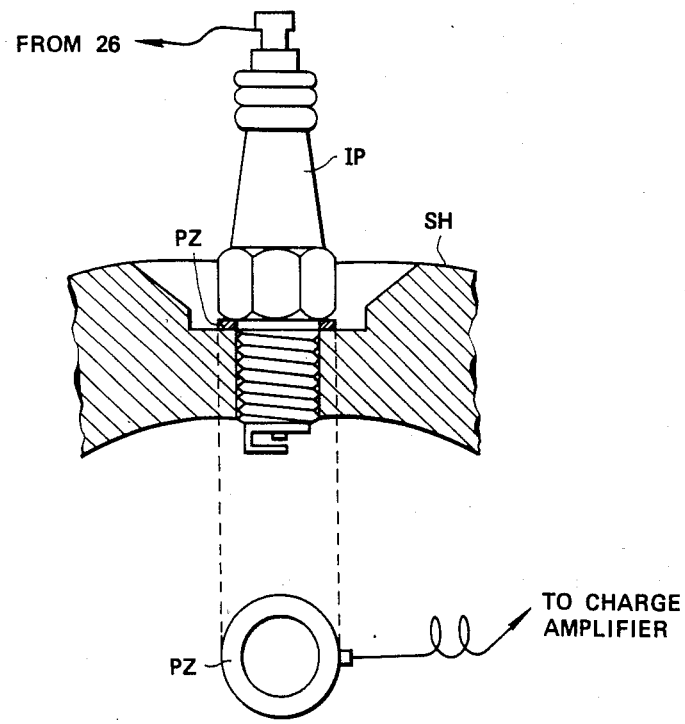
FIG. 2 is an explanatory view for a pressure sensor which is mounted on an applicable internal combustion engine.

Numeral 21 denotes a crank angle sensor preferably located around an engine crankshaft which outputs a reference position signal $S_9$ at 70 degrees before the top dead center in the compression stroke of each cylinder whenever the engine crankshaft has rotated through 120 degrees (in the case of four-cylinder engine, 180 degrees) and outputs a unit angle signal $S_{10}$ whose period corresponds to two degrees of rotation of the crankshaft. Numeral 22 denotes an ignition circuit comprising, e.g., as shown in FIG. 1(C), a DC power supply 23, an ignition coil 24, a power transistor 25, a distributor 26, and spark plugs 27A through 27F (one of the spark plugs is also shown in FIG. 2 as symbol IP). For the detailed construction of the typical ignition circuit 22, Japanese Patent Application Unexamined Open No. Sho. 58-82,074 published on May 17, 1983 and the contents thereof is hereby referenced.

Numeral 28 denotes a control unit comprising a microcomputer in terms of hardware, the microcomputer including a Central Processing Unit (CPU), a Random-Access Memory (RAM), a Read-Only Memory (ROM), and Input/Output (I/O) Port.

The control unit 28 comprises functionally, as shown in FIG. 1(B), (a) a knocking control block 29, (b) a maximum timing detection block 30, (c) an ignition timing adjustment block 31 including a deviation calculation block 31A, error amount calculating block 31B, determination block 31C, and correction value calculation block 31D, (D) an ignition timing calculation block 32, and (E) output block 33.

The knocking control block 29 compares sequentially each digital value $D_{11}$ through $D_{61}$ which is an analog-to-digital conversion result of the corresponding knocking signal $S_{11}$ through $S_{61}$ from the corresponding knocking detection circuit 13 through 18 by means of analog-to-digital converter in the I/O Port with a reference value Do (a value corresonding to a minute, negligible level of knocking) in order to determine the presence or absence of knocking. Furthermore, the knocking control block 28 calculates an angle value of correction by which the ignition timing is retarded (hereinafter referred to as a retardation angle for correction) to give zero for any of the cylinders in which no knocking has occurred on the basis of the above-described determination result and calculates the retardation angle value, for example, to give a constant angle value (for example, one degree in the crankshaft rotational angle) for each ignition, i.e., for each engine cycle for any of the engine cylinders in which the knocking has occurred.

It should be noted that the actual value of retardation angle based on the above-described retardation angle value becomes accumulatively increased in proportion to an interval during which the knocking is continuously generated.

Next, the maximum timing detection block 30 includes a counter which counts incrementally the number of pulses of the unit angle signal $S_{10}$ from the crank angle sensor 21 (each period of the pulses in the signal $S_{10}$ corresponds to two degrees in crankshaft rotational angle) and which is reset whenever the engine cylinder identification signal $S_8$ is received from the engine cylinder identification sensor 20.

Figure 6:
FIGS. 6A-6D are a waveform chart for explaining an operation of a maximum timing detection block shown in FIG. 1(B)
Figure 6:
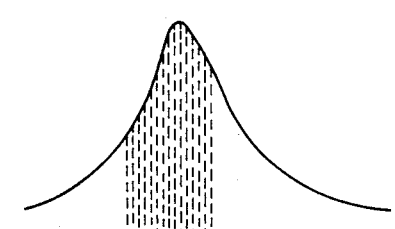
Figure 6:

The above-described operation is shown in (C) and (D) of FIG. 6.

On the other hand, the block 30 cuts off high-frequency signal components of the voltage signal $S_6$ derived from the charge amplifier 12 associated with the sixth cylinder (#6) by means of, e.g., a low pass filter incorporated in the I/O port (not shown) to obtain a second pressure signal $S_{60}$, as shown in (B) of FIG. 6, converts it into a digital value and samples the digital data at each timing of the receipt of the unit angle signal $S_{10}$ from a time when the count value of the counter has reached the value of 40 (i.e., the top dead center of the sixth cylinder), as shown in (D) of FIG. 6, compares a previous value of the sampled value with the present value thereof, and updates a predetermined address of, e.g., the RAM in which the previously counted value is stored only when the present value is larger than the previous one. It is noted that the block 30 repeats the above-described updating operation until the count value of the above-described counter has reached, e.g., 55 (which correspond to 110 degrees in the crankshaft rotated angle and correspond to 30 degrees after the top dead center since the reception timing of the signal $S_8$ is 80 degrees before the top dead center). This is appreciated from (D) of FIG. 6.

Since upon completion of the above-described processing, the predetermined address thereof contains the count value A of the counter at a time when the amplitude of second pressure signal $S_{60}$ has reached its maximum (refer to (C) of FIG. 6), a crank (crankshaft rotational) angle $\theta$pmax (ATDC) with respect to the top dead center at which the pressure in the sixth cylinder has reached its maximum is calculated by the formula; (2A-80).

Figure 7:
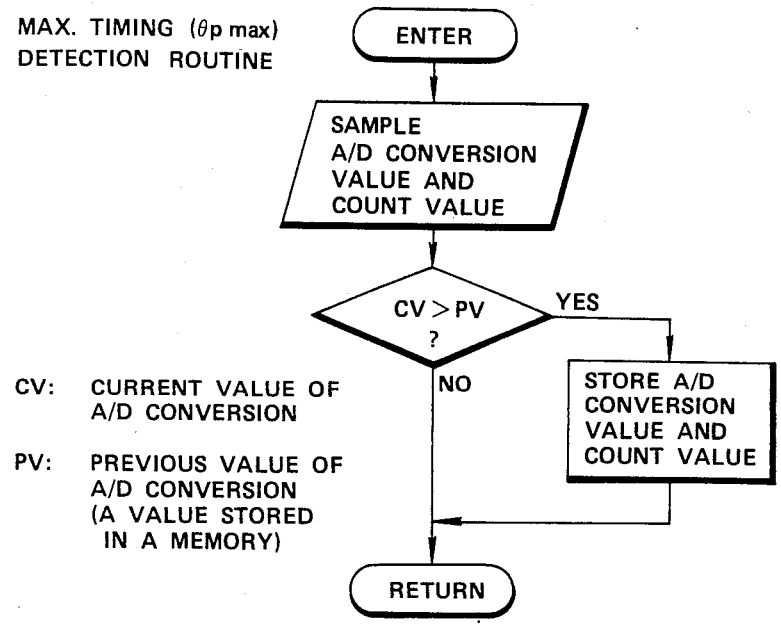
FIG. 7 is a general processing flowchart of the maximum timing detection block shown in FIG. 1(B)

FIG. 7 shows a flowchart for updating the count value A of the counter on which the block 30 executes as described above.

The ignition timing adjustment block 31 calculates a deviation $\Delta E$ between a predetermined target value $\theta T$ and the crankshaft rotational angle $\theta$pmax derived in the maximum timing detection block 30 ($\Delta E = \theta T - \theta$pmax) whenever the sixth cylinder carries out combustion (i.e., the crankshaft rotates through 720° (two revolutions) in the deviation calculation block 31A.

Next, the error amount calculation block 31B calculates an accumulated value of the deviation $\Delta E$ or a value correlated to the accumulated value whenever the deviation calculation block 31A calculates the deviation $\Delta E$ as the error amount (the error amount is reset to zero whenever the ignition timing is corrected). In addition, the determination block 31C determines whether the error amount exceeds a predetermined allowable limit value AL whenever the error amount is calculated.

The correction value calculation block 31D calculates a correction value M of the ignition timing when the above-described determination block 31C determines that the error amount exceeds the predetermined allowable limit value AL.

The detailed description of the ignition timing adjustment block 31 will be made later.

Figure 8:
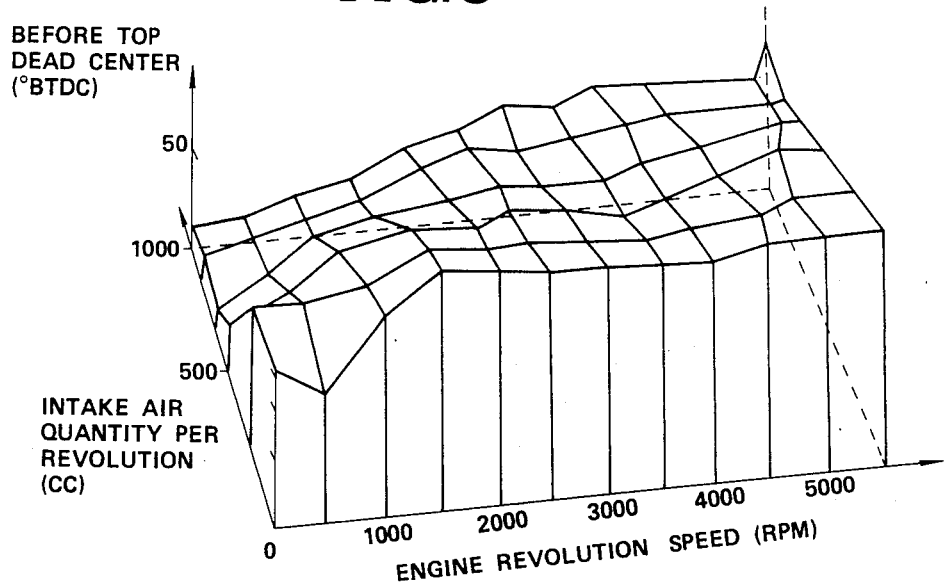
FIG. 8 is a three-dimensional contour graph of an ignition timing advance angle characteristic.

The ignition timing calculation block 32 retrieves an advance angle value N of the ignition timing from a three-dimensional table on a basic ignition timing as shown in FIG. 8 on the basis of the engine speed data and intake air quantity data in a table loop up technique. The engine speed data is derived from sequentially counting the number of pulses of the unit angle signal $S_9$ for a fixed interval of time. The intake air quantity data is derived from an analog-to-digital conversion of the intake air quantity sensor 19. The ignition timing calculation block 32 carries out the following processing utilizing the corrective retardatio angle value for avoidance of recurrence of knocking for the associated engine cylinder and correction value M for the MBT control from the ignition timing adjustment block 31.

Figure 9:
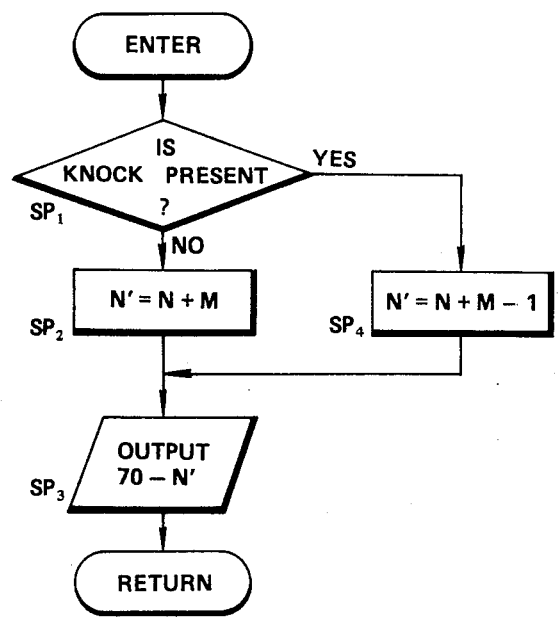
FIG. 9 is a processing flowchart of an operation of an ignition timing calculation block shown in FIG. 1(B)

As shown in a flowchart of FIG. 9 (the program flowchart of FIG. 9 is repeated whenever the reference position signal $S_9$ is inputted), the CPU of the microcomputer 2 determines whether the corrective retardation angle value M is zero or not in order to determine whether knocking has occurred in any engine cylinder in a step SP1.

For any of the engine cylinders in which knocking has not occurred, the CPU calculates an addition of the ignition advance angle value N and the correction value M for the MBT control in a step SP2 (N'=N+M). Thereafter, the CPU registers such a calculated value as (70−N') to accord with the crankshaft rotational angle corresponding to the timing of the reference signal $S_9$ into an internal register of the output block 33 in a steps P3.

For any of the engine cylinders in which knocking has occurred, the CPU calculates such an equation; i.e., N'=N+M−1 in order to make the ignition advance angle value retard (decrease) for avoidance of recurrence of knocking takiug a higher priority than the MBT control in a step SP4. Thereafter, the advance angle value N' of the calculation result is registered in the internal register of the output block 33 in the form as (70−N') in the step SP4.

Therefore, the above-described ignition timing calculation block 32 retards the ignition timing, i.e., subtracts the advanced angle value N' by one degree whenever the ignition of the corresponding spark plug 27A through 27F is once carried out, i.e., whenever reference position signal $S_9$ is inputted until the recurrence of knocking is avoided if any of the engine cylinders has generated knocking. It should be noted that the added value of N and M is not updated during retardation of the ignition timing.

For example, if the sixth cylinder is under the MBT control with the advanced angle value N'(=N+M), the ignition timing of any of the engine cylinders other than the sixth cylinder only is retarded by one degree to avoid recurrence of knocking whenver the ignition is once carried out if the corresponding cylinder has generated knocking in a case when the same advanced angle N' calculated in the step $SP_2$ is set to the other cylinders than the sixth cylinder.

Figure 10:
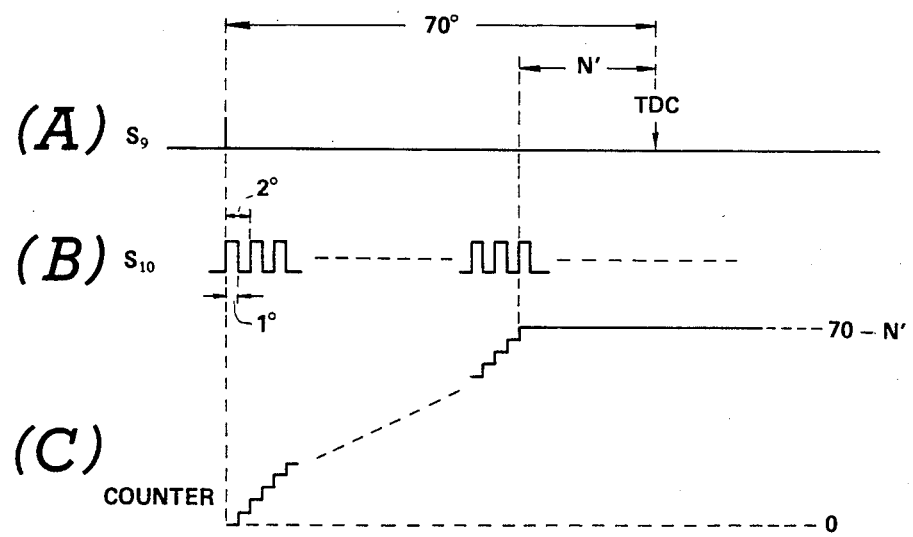
FIGS. 10A-10C are a waveform chart for explaining an operation of an output block shown in FIG. 1(B)

Next, the output block 33 includes a counter which counts incrementally the number of pulses in the unit angle signal $S_{10}$ from the crank angle sensor 21 on both rising and falling edges of each pulse of the unit angle signal $S_{10}$ and is reset whenever the reference position signal $S_9$ therefrom is received, as appreciated from (A), (B), and (C) of FIG. 10. Hence,the value of counter of the output block 33 is incremented by one whenever the crankshaft rotates through one degree.

On the other hand, the above-described register has registered the value of (70−N'), i.e., 70−(N+M) or 70−(N+M−1) from the ignition timing calculation block 32 in synchronization with the reference position signal $S_9$.

An internal comparator of the output block 33 compares the value of the register with that of the counter thereof. When both values coincide with each other, the ignition signal $S_F$ is outputted to the power transistor 25 of the ignition circuit 22.

Since the reference position signal $S_9$ is generated at 70 degrees before the top dead center of each engine cylinder, when the corresponding cylinder piston has reached N'BTDC is a time when the count value of the counter has reached a value of (70−N').

When the ignition signal $S_F$ is sent to the power transistor 25, the power transistor 25 is changed from the conductive state to the cut-off state. The ignition is then carried out in such a way that a high voltage surge is generated at a secondary winding of the ignition coil 24 and sent to one of the spark plugs (27A through 27F which is in the order of ignition via the distributor 26. Consequently, the spark plug is ignited upon receipt of the high voltage surge.

In this way, the improved driveability can be achieved on the basis of the above-described MBT control or avoidance control of recurrence of knocking.

Next, a specific processing of each part of the ignition timing adjustment block 31 will be described with reference to FIG. 11 through FIG. 13.

Figure 11:
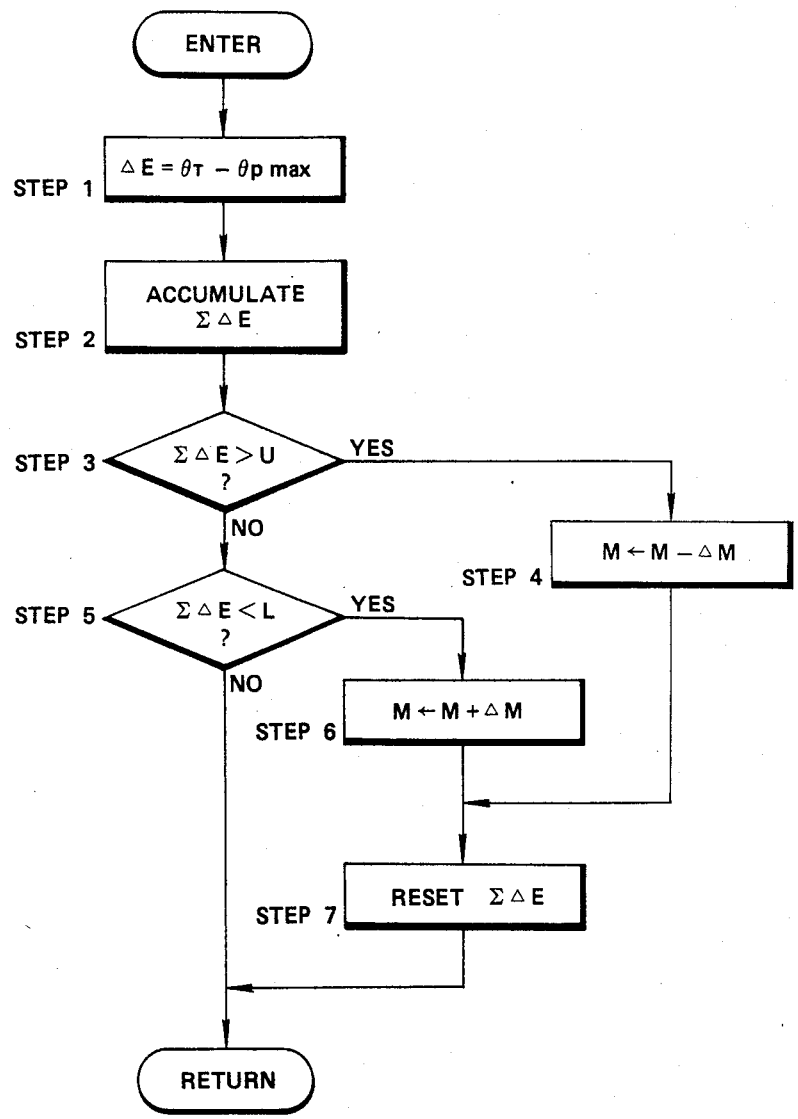
FIG. 11 through 13 show processing flowcharts in respective preferred embodiments for explaining each operation of an ignition timing adjustment block shown in FIG. 1(B)
Figure 12:
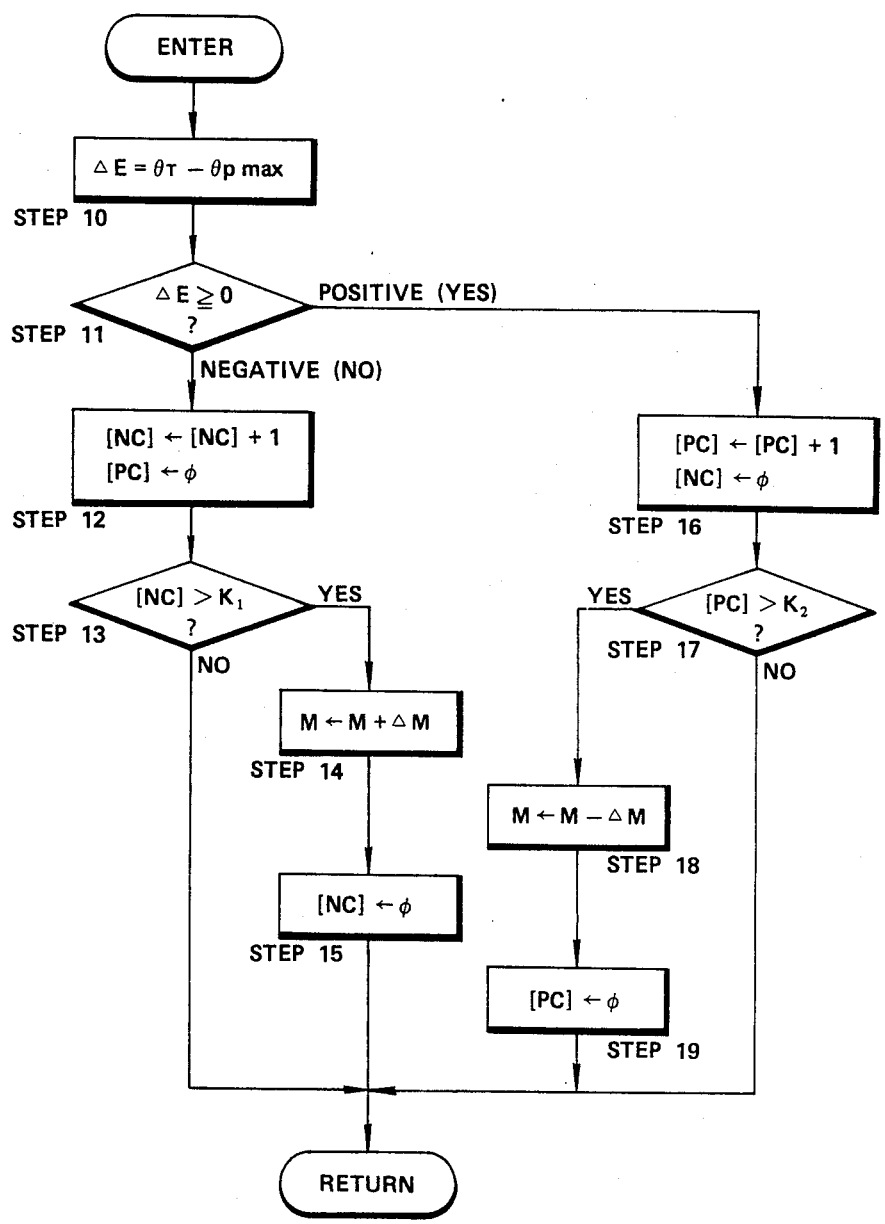
Figure 13:
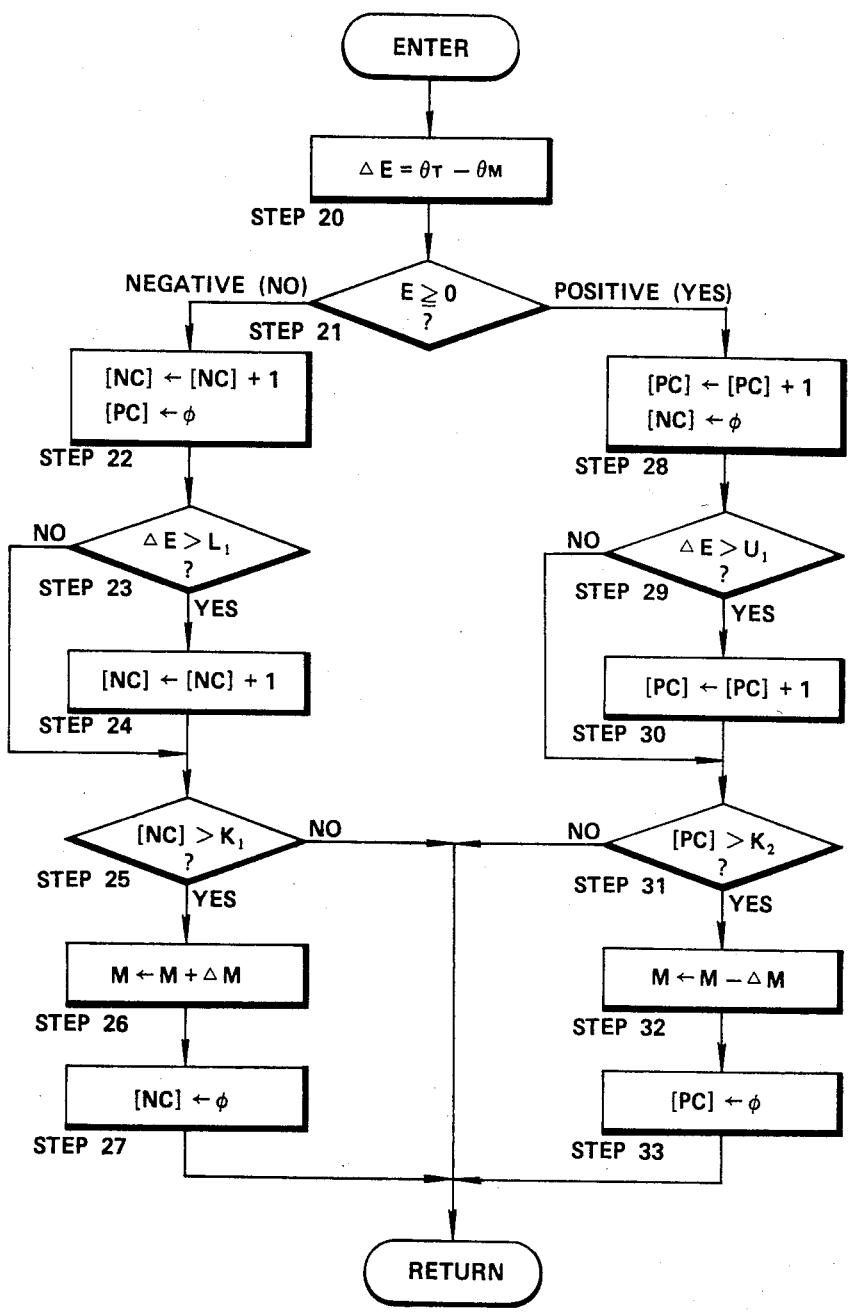

It should be noted that processing programs shown in FIGS. 11 through 13 are executed, e.g., for each predetermined crank angle position (720 degrees) after the top dead center of the sixth cylinder in synchronization with the cylinder identification signal $S_8$.

First, in an embodiment shown in FIG. 11, the CPU calculates a deviation $\Delta E$ (with a plus or minus sign) between the target value $\theta T$ and crank angle $\theta$pmax detected in the maximum timing detection block 30 in a first step STEP 1. In a step STEP 2, the deviation $\Delta E$ (with the sign) is accumulated ($\Sigma \Delta E$).

In addition, in a step STEP 3, the CPU determines whether the accumulated value, i.e., error amount $\Sigma \Delta E$ exceeds the predetermined positive limit value U, i.e., whether the ignition timing is excessively advanced. If $\Delta E > U$, i.e., the ignition timing is excessively advanced, the routine goes to a step STEP 4, wherein the previous correction value M from which a unit correction value $\Delta M$ is subtracted is outputted to the ignition timing calculation block 32 shown in FIG. 1(B) as the current correction value M (a value for correcting the retardation angle value).

In addition, in a step STEP 5, the CPU determines whether the error amount $\Sigma \Delta E$ is negative and is smaller than the predetermined negative allowable limit value L, i.e., the ignition timing is excessively retarded ($\Sigma \Delta E < L$), the routine goes to a step STEP 6, wherein the previous correction value M to which a unit correction value $\Delta M$ is added is outputted to the ignition timing calculation block 32 as the present correction value M (a value for correcting the retardation angle).

After the processing of steps STEP 4 or STEP 6, the routine goes to a step STEP 7, wherein the error amount $\Sigma \Delta E$ is set to zero for the subsequent determination processing of the same figure. If $L \leqq \Sigma \Delta E \leqq U$, no new correction value is calculated.

If the above-described processing is executed for each 720° crankshaft rotational angle, the ignition timing is corrected in a quick response when the crankshaft rotational angle value $\theta$pmax is largely deviated from the target value $\theta_T$ and the ignition timing is, on the other hand, corrected in a slow response when the crankshaft rotational angle value $\theta$pmax is not so largely deviated from the target value. Therefore, responsiveness can be improved during the transient driving of engine and control stability can also be obtained under the normal driving state.

Next, in another embodiment shown in FIG. 12, the similar processing of the step STEP 1 of FIG. 11 is carried out in a step STEP 10. In the next step STEP 11, a polarity of the deviation $\Delta E$ is checked. If the deviation $\Delta E$ is negative in the step STEP 11, the routine goes to a step STEP 12, wherein a count value [NC] of a counter NC for counting a number of times the negative error amount ($-\Delta E$) has generated continuously is incremented by one (+1) and a count value [PC] of another counter PC for counting a number of times the positive error amount (+$\Delta E$) has generated continuously is reset to zero. On the contrary, if the deviation $\Delta E$ is positive, the count value [PC] of the counter PC is incremented by one (+1) and the count value [NC] of the counter NC is reset to zero.

In a step STEP 13, the CPU determines whether the count value [NC] of the counter NC is deemed to be an error amount correlated to the accumulated value $\Sigma \Delta E$ described in FIG. 11 and the error amount [NC] exceeds a predetermined allowable limit value $K_1$ (corresponds to a determination of the step STEP 5 of FIG. 11). If [NC] > $K_1$, the routine goes to a step STEP 14, wherein the same processing as in the step STEP 6 of FIG. 11 is carried out ($M \leftarrow M + \Delta M$). In the next step STEP 15, the count value [NC] of the counter NC is reset to zero ([NC]$\leftarrow$0). It should be noted that if $\Delta E$ indicates zero, the routine returns without calculation of such correction.

In the embodiment shown in FIG. 12, the intensity of the deviation $\Delta E$ is not used for processing. Since the combustion state is not stable, a control stability can be obtained without excessive correction of ignition timing under the unstable combustion condition.

A still another embodiment will be described with reference to FIG. 13.

In a step STEP 20, the CPU calculates the deviation $\Delta E$ ($\Delta E = \theta_T - \theta_M$).

If the deviation $\Delta E$ exceeds neither a negative set value $L_1$ (negative) nor a positive set value $U_1$ (positive), the count values [NC], [PC] of the two counters NC, PC are incremented by plus one in the steps STEP 22 and STEP 28. On the other hand, if the absolute value of the deviation $\Delta E$ exceeds the set values $L_1$ and $U_1$, in the steps STEP 24 and STEP 30, the count values [NC] and [PC] are again incremented by one in addition to the steps STEP 22 and STEP 28. Since the intensity of the deviation $\Delta E$ is considered, the controllability can be improved even under unstable combustion and quick correction of ignition timing can also be achieved when the deviation $\Delta E$ is large and continues for a long period of time.

It should be noted that the step STEP 21 in FIG. 13 corresponds to the step STEP 11 in FIG. 12 and the steps STEP 25 through STEP 27 and the steps STEP 31 through STEP 33 correspond to steps STEP 13 through STEP 15 and steps STEP 17 through STEP 19 in FIG. 12, respectively.

Although in the above-described embodiments, the crankshaft rotational angle value $\theta$pmax is calculated on the basis of the pressure signal $S_6$ corresponding to the pressure sensor 6 installed in the sixth cylinder, the angle value $\theta$pmax may be calculated on the basis of one of the other pressure signals corresponding to one of the other pressure sensors 1 through 5 shown in FIG. 1 installed in one of the other cylinders (#1 through #5) than the sixth cylinder. Alternatively, one in-cylinder pressure sensor may be incorporated in a cylinder gasket and on the basis of the pressure signal, the crank angle value $\theta$pmax may be calculated. The pressure sensor which is incorporated in the cylinder gasket is exemplified by Japanese Patent Application Unexamined Open No. Sho 58-82,074, the contents of which is hereby referenced.

As described hereinabove, since in the system and method according to the present invention, an accumulated value or a value correlated to the accumulated value of a deviation between a crankshaft rotational angle value at a time when pressure in a combustion chamber has reached its maximum and a target value thereof at which the engine output torque is maximum is calculated as an error amount whenever the deviation is calculated, whether the error amount exceeds a predetermined allowable limit value is determined whenever the error amount is calculated, and a corrective amount of the ignition timing is calculated when the error amount exceeds the allowbale limit value, the correction of ignition timing can be carried out in a quick response particularly when the engine is in a transient operating state and thus driveability of the engine can be improved.

It will clearly be appreciated from those skilled in the art that the foregoing description is made in terms of preferred embodiments and various changes and modifications may be made without departing from the scope and spirit of the present invention which is to be defined by the appended claims.

What is claimed is:

1. A method for controlling an engine ignition timing, comprising the steps of:
   (a) detecting an engine crankshaft rotational angle at which pressure in a combustion chamber has reached its maximum whenever the corresponding engine cylinder is in a combustion stroke;
   (b) calculating a deviation between the crankshaft rotational angle detected in said step a) and a predetermined target value thereof;
   (c) calculating an error amount based on an accumulation of the deviation calculated in said step (b);
   (d) determining whether the error amount exceeds a predetermined allowable limit; and
   (e) correcting the current ignition advance angle value based on the engine operating condition by an engine crankshaft rotational angle value so that the engine crankshaft rotational angle value at which the combustion pressure has reached its maximum accords with the predetermined target value whenever the error amount exceeds the predetermined allowable limit in said step (d).

2. The method according to claim 1, wherein step (b) further includes calculating an accumulation of the calculated deviation and step (c) includes calculating an error amount based on a value correlated to the accumulated deviation values calculated in step (b).

3. A system for controlling an ignition timing of an internal combustion engine, comprising:
   (a) first means for calculating a deviation between an engine crankshaft rotational angle value at a time when pressure in a combustion chamber of one engine cylinder has reached its maximum and a predetermined target value thereof;
   (b) second means for calculating a value correlated to the accumulation of the deviation value as an error amount whenever said first means calculates the deviation;
   (c) third means for comparing the error amount with a predetermined allowable limit value whenever said second means calculates the error amount to determine whether the error amount exceeds the predetermined allowable limit value;
   (d) fourth means for calculating a correction value for the ignition timing when said third means determines that the error amount exceeds the predetermined allowable limit value, the error amount being reset to zero whenever the calculation of the correction value is made; and
   (e) fifth means for igniting a plurality of spark plugs according to a predetermined ignition order at a corrected timing calculated by said fourth means.

4. The system according to claim 3, wherein said second means comprises: fifth means for accumulating the deviation whenever said first means calculates the deviation, and sixth means for resetting the accumulated value calculated by said fifth means to zero whenever the ignition timing is corrected.

5. The system according to claim 3, wherein said second means comprises: (a) fifth means for counting a number of times a positive deviation has been continuously generated or a negative deviation has been continuously generated on the basis of the deviation whenever said first means calculates the deviation, the counted value being the error amount correlated to the accumulated value; and (b) sixth means for resetting the count value of said fifth means to zero whenever the ignition timing is corrected.

6. A system for controlling an engine ignition timing, comprising:
   (a) first means for detecting an engine crankshaft rotational angle at which pressure in a combustion chamber has reached its maximum;
   (b) second means for calculating a deviation between the detected value of the crankshaft rotational angle and a predetermined target value thereof;
   (c) third means for calculating an error amount based on an accumulated value of the deviation whenever said second means calculates the deviation;
   (d) fourth means for determining whether the error amount exceeds a predetermined allowable limit whenever said third means accumulates the deviation; and
   (e) fifth means for correcting the ignition timing by an angle value so that the engine crankshaft rotational angle value at which pressure in the combustion chamber has reached its maximum accords with the predetermined target value whenever said fourth means determines that the error amount exceeds the predetermined allowable limit.

7. The system according to claim 6, which further comprises sixth means for resetting the error amount to zero whenever said fourth means determines that the error amount exceeds the predetermined allowable limit value.

8. The system according to claim 6, wherein said fourth means determines whether the error amount exceeds a positive allowable limit value and said fifth means retards the present ignition timing by an angle which is derived from a subtraction of the value of a previous ignition advance angle from a predetermined value of advance angle.

9. The system according to claim 6, wherein said fourth means determines whether the error amount exceeds a negative allowable limit value and said fifth means advances the present ignition timing by an angle which is derived from an addition of the value of a previous ignition advance angle to a predetermined value of advance angle.

10. The system according to claim 6 further comprises:
    (a) sixth means for detecting an occurrence of knocking in an engine cylinder corresponding to the combustion chamber; and
    (b) seventh means for retarding the corrected ignition timing by said fifth means by a predetermined engine crankshaft rotational angle value when said sixth means detects the occurrence of knocking.

11. The system according to claim 10, wherein the predetermined engine crankshaft rotational angle is one degree.

12. The system according to claim 6, which further comprises:
    (a) sixth means for determining an occurrence of knocking separately for each engine cylinder depending on whether a retardation of the ignition timing for the corresponding engine cylinder is carried out to avoid recurrence of knocking; and (b) seventh means for retarding the ignition timing so as to discuss the corrected ignition timing value derived in said fifth means by a predetermined angle value for any of the engine cylinders in which the knocking is determined to occur by said sixth means.

13. The system according to claim 12, wherein said fifth means corrects the ignition timing for any of the engine cylinders in which the knocking is determined not to occur by said sixth means in such a way that the angle value is added to an ignition timing advance angle value determined according to an engine operating condition.

14. The system according to claim 6, wherein said third means includes: (a) sixth means for determining a polarity of the deviation; (b) seventh means for counting a numer of times a negative deviation has continuously generated when said sixth menas determines that the deviation has the negative polarity, the counted value of said seventh means being the error amount; and (c) eighth means for counting a number of times a positive deviation has continuously generated when said sixth means determines that the value of the deviation has the positive polarity, the count value of said eighth means being the error amount.

15. The system according to claim 14, wherein the count value of said eighth means is reset to zero when said sixth means determines that the deviation has the negative polarity and the count value of said seventh means is rest to zero when said sixth means determines that the deviation has the positive polarity.

16. The system according to claim 15, which further comprises:
(a) ninth means for determining whether the deviation exceeds a first predetermined value so as to determine an intensity of the deviation when said sixth means determines that the deviation has the positive polarity;
(b) tenth means for determining whether the absolute value of deviation exceeds a second predetermined value so as to determine an intensity of the deviation when said sixth means determines that the deviation has the negative polarity and
wherein the seventh means counts incrementally by one whenever said tenth means determines that the value of the deviation exceeds the second predetermined value of said eighth means counts incrementally by one whenever said ninth means determines that the value of the deviation exceeds the first predetermined value.

* * * * *